United States Patent [19]
Bergmans et al.

[11] Patent Number: 6,060,846
[45] Date of Patent: May 9, 2000

[54] DIODE MODULATOR GENERATING A LINE S-CORRECTION

[75] Inventors: Christianus H. J. Bergmans; Fransiscus M. J. Nooijen, both of Eindhoven, Netherlands

[73] Assignee: U.S. Philips Corporation, New York, N.Y.

[21] Appl. No.: 08/914,054

[22] Filed: Jul. 15, 1997

[30] Foreign Application Priority Data

Aug. 26, 1996 [EP] European Pat. Off. .............. 96202368

[51] Int. Cl.$^7$ ...................................................... H04N 3/23
[52] U.S. Cl. ........................................... 315/371; 315/408
[58] Field of Search ................................. 315/411, 408, 315/370, 371

[56] References Cited

U.S. PATENT DOCUMENTS

| | | | |
|---|---|---|---|
| 4,206,388 | 6/1980 | Ishigaki et al. ........................... | 315/371 |
| 4,429,257 | 1/1984 | Haferl ...................................... | 315/371 |
| 4,686,430 | 8/1987 | Jennings, Jr. ............................ | 315/371 |
| 4,814,477 | 3/1989 | Dieterle et al. .......................... | 315/411 |
| 5,519,447 | 5/1996 | Shima ...................................... | 348/556 |
| 5,717,296 | 2/1998 | Onozawa et al. ........................ | 315/371 |

FOREIGN PATENT DOCUMENTS

| | | |
|---|---|---|
| 0236064B1 | 4/1993 | European Pat. Off. . |
| 3937878 | 5/1991 | Germany . |

OTHER PUBLICATIONS

PHF 95,557 Patent Application (French Version FR 9511035) Dated Jun. 24, 1996.
Philips Electronic Components and Materials, Technical Publication 201, Date of Release Apr. 10, 1986.

*Primary Examiner*—Edward P. Westin
*Assistant Examiner*—Shane R Gardner
*Attorney, Agent, or Firm*—Edward W. Goodman

[57] ABSTRACT

A diode modulator circuit which is adapted to supply an acceptable S-correction of the S-linearity error of the line scanning of a picture tube (CRT) at substantially different line scan widths. A known diode modulator has two loops. The first loop includes a series arrangement of a line deflection coil (LD) and an S-capacitor (CS), which series arrangement is arranged in parallel with a first flyback capacitor (CF1) and a first diode (D1). The second loop includes a modulator coil (LB) arranged in parallel with a second flyback capacitor (CF2) and a second diode (D2). The two loops are arranged in series. An inner-pincushion capacitor (CSM) is arranged in a common path in which the line deflection current (Id) and a modulator current (Ib) flowing through the modulator coil (LB) flow in opposite directions. The amount of S-correction depends on the values of the S-correction capacitor (SC) and the inner-pincushion capacitor (CSM). The S-capacitor (CS) has been omitted in the subject diode modulator. In this way, the amount of S-correction at minimal scan width will be zero because the common current (Im) flowing in the common path is zero if the diode modulator is in equilibrium. The diode modulator according to the invention can thus cope with picture tubes (CRT) which require a very low amount of S-correction at a small scan width without the need for an additional capacitor (CS2) and a thyristor switching circuit (T) to activate the additional capacitor (CS2) to lower the amount of S-correction at the small scan width.

7 Claims, 3 Drawing Sheets

DIODE MODULATOR GENERATING A LINE S-CORRECTION

BACKGROUND OF THE INVENTION

1. Field of the Invention

The invention relates to a diode modulator for obtaining a line scanning with a line S-correction. The invention also relates to a picture display device comprising such a diode modulator.

2. Description of the Related Art

U.S. Pat. No. 5,666,033, corresponding to non-prepublished French patent application No. 9511035 filed on Sep. 20, 1995, (Attorneys docket PHF 95,557), describes a circuit for generating an acceptable line S-correction suitable at two mutually different line deflection amplitudes. This U.S. Patent application describes a diode modulator circuit which comprises an S-capacitor, an additional S-capacitance, and a thyristor. The thyristor activates or deactivates the additional S-capacitance for the purpose of correcting the S-correction of a television image having a 4/3 aspect ratio which is displayed on a picture screen having a 16/9 aspect ratio. In this way, it is possible to obtain an acceptable S-correction in the line direction at the two values of the line-scanning currents corresponding to the line scan widths at the 4/3 and the 16/9 aspect ratios, respectively.

The circuit described in the above U.S. Patent has the drawback that a lot of extra components are needed to obtain an acceptable S-correction at the two scan widths. This is expensive, and as these extra components are used in high-voltage and large-current surroundings, the reliability decreases. Moreover, the S-correction obtained is only optimal in the proximity of the 3/4 and 16/9 scan widths.

SUMMARY OF THE INVENTION

It is an object of the invention to provide a simple and economic circuit for generating a line S-correction.

To this end, a first aspect of the invention provides a diode modulator circuit comprising a first parallel arrangement of a first diode and a first capacitor; a second parallel arrangement of a second diode and a second capacitor, said second parallel arrangement being arranged in series with said first parallel arrangement; a switching element coupled across the series arrangement of said first and second parallel arrangements, a first terminal of the switching element being connected to a cathode of the first diode, a cathode of the second diode being connected to an anode of the first diode at a junction point of said first and second parallel arrangements; a deflection coil having a first end which is non-capacitively coupled to the first terminal and a second end which is coupled to a further terminal; a modulator coil coupled between the further terminal and a reference terminal; and a third capacitor coupled between the connection point and the further terminal, a common current flowing through the third capacitor, said common current being composed of a deflection current flowing through the deflection coil and a modulator current flowing through the second coil in series with the line deflection coil, the deflection current and the modulator current flowing in opposite directions through the third capacitor; wherein the second end of the deflection coil is non-capacitively coupled to the further terminal, and an amount of line S-correction depends on the common current and a value of the third capacitor only.

A second aspect of the invention provides a picture display device comprising a diode modulator comprising a first parallel arrangement of a first diode and a first capacitor; a second parallel arrangement of a second diode and a second capacitor, said second parallel arrangement being arranged in series with said first parallel arrangement; a switching element coupled across the series arrangement of said first and second parallel arrangements, a first terminal of the switching element being connected to a cathode of the first diode, a cathode of the second diode being connected to an anode of the first diode at a junction point of said first and second parallel arrangements; a deflection coil having a first end which is non-capacitively coupled to the first terminal and a second end which is coupled to a further terminal; a modulator coil coupled between the further terminal and a reference terminal; and a third capacitor coupled between the junction point and the further terminal, a common current flowing through the third capacitor, said common current being composed of a deflection current flowing through the deflection coil and a modulator current flowing through the second coil in series with the line deflection coil, the deflection current and the modulator current flowing in opposite directions through the third capacitor; the picture display device further comprising a synchronizing circuit for receiving synchronization information from a video source to supply drive pulses to a control input of the semiconductor switching element, and a picture tube which is line-scanned in response to the line deflection current flowing through the line deflection coil, wherein the second end of the deflection coil is non-capacitively coupled to the further terminal, and an amount of line S-correction depends on the common current and a value of the third capacitor only.

Picture tubes require a certain amount of S-correction at full scan width, but a lower amount of S-correction at a smaller scan width. The flatter the picture tube screen, the larger the difference in amount of S-correction required at two different scan widths. An example of a flat picture tube is the Philips wide-screen picture tube W66ESF002X13 which requires an amount of S-correction for a 4/3 scan width that is much lower than the amount of S-correction at the full or 16/9 scan width.

The circuit described in U.S. Pat. No. 5,666,033 is designed to obtain the right amount of S-correction at 16/9 scan width. It appeared that the amount of S-correction at 4/3 scan was too high. So an additional S-capacitance is activated by using a thyristor circuit to lower the amount of S-correction at the 4/3 scan width.

The invention is based on the recognition that the S-correction capacitor in series with the line deflection coil can be omitted, and that, due to this measure, there is neither any need for the additional S-capacitance and thyristor circuit to obtain the right amount of S-correction at two substantially different scan amplitudes. By omitting the S-correction capacitor and determining appropriate values of other components of the diode modulator, it is possible to obtain a larger difference between the amount of S-correction generated at a certain scan width (for example, 16/9) and the amount of S-correction generated at a smaller scan width (for example, 4/3,). This will be elucidated in the description of the Figures. A global explanation is given in the following description.

The diode modulator described in U.S. Pat. No. 5,666,033 comprises two loops. The first loop comprises a series arrangement of a line deflection coil and an S-capacitor, this series arrangement being arranged in parallel with a first flyback capacitor and a first diode. The second loop comprises a modulator coil arranged in parallel with a second flyback capacitor and a second diode. The two loops are arranged in series. A semiconductor switch is arranged in parallel with the series arrangement of the two loops. In both loops, the respective coils and flyback capacitors are resonating during the line flyback period to obtain a line flyback. During the line scan period, the diodes and/or the semiconductor switch are conducting to obtain a constant voltage across each loop for generating a substantially sawtooth-shaped current through each coil. The substantially sawtooth-shaped line deflection current causes a substantially parabola-shaped voltage across the S-capacitor. This voltage causes S-correction of the line deflection current. The line deflection current and a modulator current flowing through the modulator coil flow as a common current through a common path to a junction of the two parallel arrangements of the flyback capacitors and diodes. The line deflection current and the modulator current flow in opposite directions through an inner-pincushion capacitor which is arranged in the common path. At minimum line scan width, the diode modulator is in equilibrium and the common current is zero. The amount of S-correction depends on the minimal line scan current and the value of the S-capacitor. At maximum line scan width, a maximum voltage occurs across the line deflection coil and the voltage across the modulator coil is zero. The current flowing through the S-capacitor and the current flowing through the inner-pincushion capacitor are equal to the maximal line scan current. The amount of S-correction depends on the maximal line scan current and the value of the series capacitance of the S-capacitor and the inner-pincushion capacitor, and will thus be larger than the amount of S-correction at minimum line scan amplitude. As the amount of S-correction at minimum scan width is not low enough to accommodate the requirements of the picture tube used, an additional S-capacitor is activated.

In the diode modulator according to the invention, both the S-capacitor and the additional S-capacitor have been omitted. In this way, the amount of S-correction at minimal scan width will be zero due to the fact that the common current is zero if the diode modulator is in equilibrium. The diode modulator according to the invention can thus cope with picture tubes which require a very low amount of S-correction at a small scan width. There is no need for the additional capacitor and the thyristor switching circuit to activate the additional capacitor to lower the amount of S-correction at the small scan width. The invention is particularly useful if a continuous zoom between a 16/9 scan width and a 4/3 scan width on a display tube having a 16/9 aspect ratio has to be performed in a simple way.

European Patent specification EP-B-0 236 064 describes a deflection apparatus with inner-pin-cushion distortion correction. An S-correction capacitor has been arranged in series with the line deflection coil to obtain the S-correction which is called S-shaping. A series arrangement of a capacitor and an adjustable coil form a resonant circuit which has been arranged in parallel with the S-correction capacitor to obtain inner-pincushion distortion correction. Thus, in this circuit, principally two capacitors are needed: an S-correction capacitor and a capacitor for determining the resonance frequency of the resonant circuit. The resonant circuit resonates, during the line trace period, at a frequency which is higher than the trace resonance frequency of the series arrangement of the deflection coil and the S-correction capacitor. It has been made clear in EP-B-0 236 064 that the circuit described does not operate as a diode modulator. This follows from the description that in a prior-art circuit (diode modulator), a modulator coil is used instead of the adjustable coil. The document states that this modulator coil is serially coupled, during at least a portion of the retrace, with the deflection coil, thereby increasing the retrace voltage and the deflection power dissipation. The circuit described in EP-B-0 236 064 is not a diode modulator, which is also clear from the following. In a diode modulator, wherein the adjustable coil would be the modulator coil, the value of the adjustable coil would greatly influence the amplitude of the line deflection current. It would be very undesirable to change the amplitude of the deflection by adjusting the amount of inner-pincushion correction. Moreover, the deflection current and the current through the resonant circuit flow in the same direction through the S-capacitor, which is in contrast to a diode modulator wherein these currents flow in the opposite direction through the inner-pincushion capacitor.

In an embodiment according to the invention, an extra voltage source is added in series with the modulator coil. This voltage source generates a positive DC-scan voltage and a negative flyback voltage. The effect of this voltage on the amount of S-correction is as follows. It is assumed that the value of the modulator coil is adapted in such a way that the open E/W voltage which occurs at one of the terminals of the inner-pincushion capacitor does not change and therefore the minimum value of the deflection current does not change. In this situation, at the minimum value of the line deflection current, the amount of S-correction is still zero as the line deflection current and the modulator current cancel each other in the common path in which the inner-pincushion capacitor is situated. The amount of S-correction at zero E/W voltage at which the maximum scan current flows decreases as the voltage source causes a modulator current through the modulator coil which flows through the inner-pincushion capacitor in the opposite direction to the deflection current. This has the advantage that the value of the inner-pincushion capacitor can be decreased. In practice, the value of the inner-pincushion capacitor has to be selected from a series of available values. It is a further advantage of the extra voltage source that by choosing its right value, it is possible to obtain the right amount of S-correction at a certain fixed value of the inner-pincushion capacitor.

In an embodiment according to the invention, a simple line shift circuit is obtained by adding an adjustable current source across a blocking capacitor which is arranged in series with the modulator coil. The blocking capacitor prevents a DC-current from flowing through the series arrangement of the supply source, the line deflection coil and the modulator coil. The adjustable current source generates a small DC-voltage across the blocking capacitor to obtain a small DC-current through the line deflection coil. The sign and the value of the DC-voltage are adjustable to obtain a desired shift of the displayed picture in the line direction. In the known diode modulator, in which the S-capacitor is arranged in series with the line deflection coil and without a blocking capacitor in series with the second coil, the same DC-shift circuit could be arranged across the S-correction capacitor. This has the disadvantages that the DC-shift circuit would show a large dissipation as the impedances used should be high enough to prevent a detrimental influence on the S-correction, and that the DC-shift circuit would have to be adapted to accommodate the high-voltage pulses occurring at terminals of this S-correction capacitor. It may be clear that the simple DC-shift circuit according to the invention only functions if no other capacitor than the blocking capacitor is arranged in series with the series arrangement of the line deflection coil and the modulator coil, thus only if no S-capacitor is arranged in series with the line deflection coil.

In an embodiment according to the invention, the blocking capacitor has one end connected to a reference terminal.

The reference terminal may be at ground potential or may be connected to a DC-supply source. In both cases the line shift circuit becomes even simpler and cheaper as only very low voltages occur at both ends of the blocking capacitor.

These and other aspects will be described and elucidated with reference to the accompanying drawings.

DESCRIPTION OF THE PREFERRED EMBODIMENTS

Figure 1:
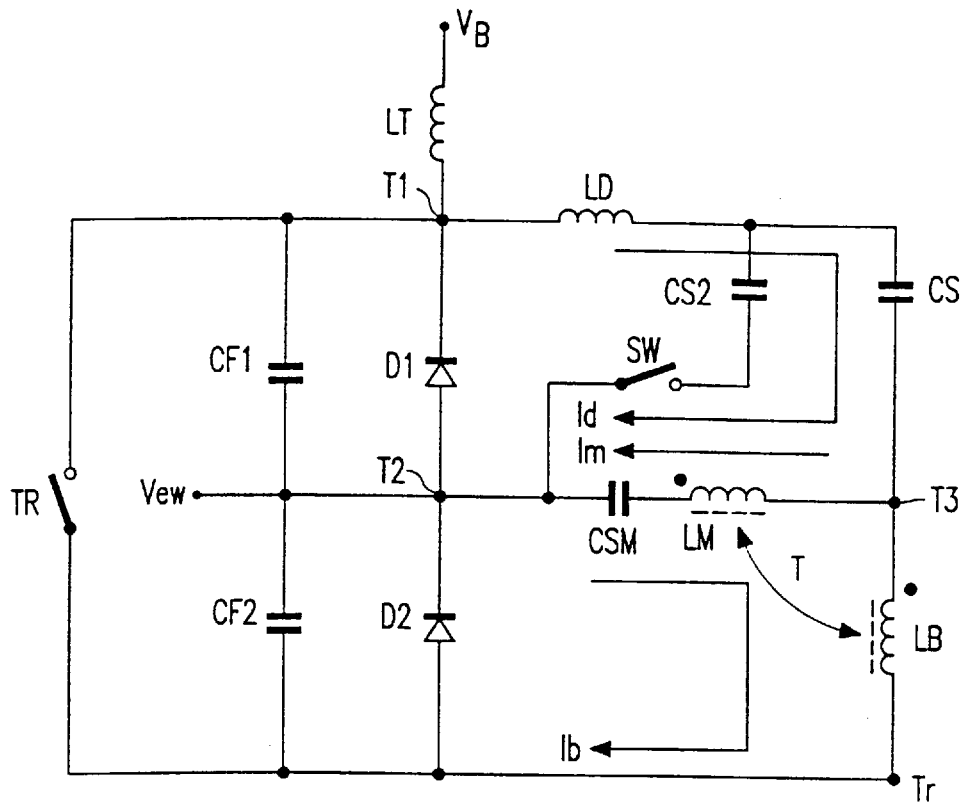
FIG. 1 is a circuit diagram of a diode modulator of the type described in French patent application 9511035, in which the amount of S-correction at a second line amplitude is corrected by activating or deactivating an additional S-capacitor in parallel with a primary S-capacitor.

FIG. 1 is a circuit diagram of a diode modulator in which the amount of S-correction at a second line scan amplitude is corrected by activating or deactivating an additional S-capacitor CS2.

French patent application 9511035 describes a diode modulator which comprises the additional S-capacitor CS2 and a thyristor circuit shown as a switch SW for activating the additional capacitor CS2. The way of operating a diode modulator is well-known, for example from the Philips Electronic Components and Materials Technical publication 201 released in 1986, so that an in-depth discussion can be refrained from. Issues relevant to the invention will be discussed hereinafter.

The diode modulator comprises two loops. A main loop comprises a series arrangement of the line deflection coil LD and an S-correction capacitor CS. During a line scan period, a substantially sawtooth-shaped line deflection current Id flows through the line deflection coil LD. The S-correction capacitor CS integrates the line deflection current Id into a substantially parabola-shaped voltage. This parabola-shaped voltage across the line deflection coil LD causes S-correction on the line deflection current Id. The series arrangement of the line deflection coil LD and the S-capacitor CS is coupled in parallel with a parallel arrangement of a first diode D1 and a first flyback capacitor CF1. The second loop comprises a modulator coil LB which is coupled, in parallel, with a parallel arrangement of a second diode D2 and a second flyback capacitor CF2. The parallel arrangement of the first diode D1 and the first flyback capacitor CF1, and the parallel arrangement of the second diode D2 and the second flyback capacitor CF2 are connected in series at a junction point T2. A semiconductor switching element TR is connected across the series arrangement. A choke-coil LT is connected between a supply source VB and a first terminal T1 of the semiconductor switching element TR. The choke-coil may be a line output transformer which generates, inter alia, an anode voltage for the picture tube. A cathode of the first diode D1 is connected to the first terminal T1, and a cathode of the second diode D2 is connected to an anode of the first diode D1 at the junction point T2. The deflection coil LD has a first end which is connected to the first terminal Ti and a second end which is connected to a further terminal T3 via the S-capacitor CS. The modulator coil LB is connected between the further terminal T3 and a reference terminal. A third capacitor, further referred to as inner-pincushion capacitor CSM, is coupled between the junction point T2 and the further terminal T3. A common current Im, which is composed of the line deflection current Id flowing through the deflection coil LD and a modulator current Ib flowing through the modulator coil LB, flows through the inner-pincushion capacitor CSM arranged in a common path to the junction point T2. The deflection current Id and the modulator current Ib flow in opposite directions through the common path. A transformer T is added which has a primary winding which is the modulator coil LB, and a secondary winding LM which is arranged in the common path in series with the inner-pincushion capacitor CSM to ensure that, at high amounts of S-correction, the second diode D2 is conducting during the first part of the scan. The secondary winding LM has a first end which is connected to the further terminal T3, and a second end which is connected to the inner-pincushion capacitor CSM.

The amplitude of the line deflection current Id and the modulator current Ib can be adjusted by influencing the voltage division across the deflection coil LD and the modulator coil LB. This voltage division may be controlled by modulating a voltage Vew at the junction point T2 mentioned above. A decreasing modulating voltage Vew causes an increasing line deflection current Id and a decreasing modulator current Ib. In this way, it is possible to control the amplitude of the line deflection current Id and thus the width of the line scan. This amplitude control is also used to compensate for East-West pincushion distortion by modulating the amplitude of the line deflection current Id with a vertical rate parabola signal for decreasing the amplitude of the line deflection current Id from the center line of the screen in the direction of the top or bottom of the screen.

Certain picture tubes show inner-pincushion distortion which is visible as inwardly bent vertical lines at horizontal positions between the vertical edge and the center of the picture tube. The inner-pincushion distortion can be corrected by generating a larger amount of S-correction around the horizontal axis of the screen than at the top and bottom of the screen. Such a modulation of the amount of S-correction can be obtained by adding a capacitor CSM in the common path in which the line deflection current Id and the modulator current Ib flow. The influence of this inner-pincushion capacitor CSM can be elucidated as follows. At minimum amplitude of the line deflection current Idmin (see FIG. 2), the modulation voltage Vew is not applied and the diode modulator is in equilibrium: the line deflection current Id equals the modulator current Ib, and the common current Im in the common path is zero. Thus, the contribution of the inner-pincushion capacitor CSM to the total amount of S-correction is zero at minimum line amplitude Idmin. At maximum amplitude of the line deflection current Idmax, the modulation voltage Vew is zero: the total supply voltage VB occurs across the line deflection coil LD and thus the maximum line deflection current Idmax is flowing. The modulator current Ib is zero as the voltage across the modulator coil LB is zero. Thus, the maximum common current Immax, which is equal to the maximum line deflection current Idmax, flows in the common path, and thus the voltage across the inner-pincushion capacitor Csm has a maximum value. In this situation, the total S-correction is determined by the (substantially parabola-shaped) voltages occurring across both the S-capacitor Cs and the inner-pincushion capacitor Csm and is thus large at the maximum value of line deflection current Idmax. The transformer T is not relevant to the invention. The secondary winding LM transforms the current Ib flowing through the primary coil LB to ensure that this transformed current is always smaller than the line deflection current Id, as is elucidated in the Philips Technical publication 201 in more detail.

It will be clear from the above that the minimal S-correction Smin occurs in the situation when the diode modulator is in equilibrium and the common current is zero. This minimal S-correction Smin is caused by the minimal deflection current Idmin flowing through the S-capacitor CS in series with the line deflection coil LD. The deflection current Id occurring at the 4/3 scan width on a 16/9 picture tube screen has a value near the minimal deflection current Idmin and, thus, the S-correction S4/3 obtained is slightly above the minimum S-correction Smin caused by the S-capacitor CS only. If this amount of S-correction S4/3 occurring at the 4/3 scan width appears to be too large, the circuit described in the French application activates an additional capacitor Cs2 for lowering the amount of S-correction to an acceptable value.

Figure 2:
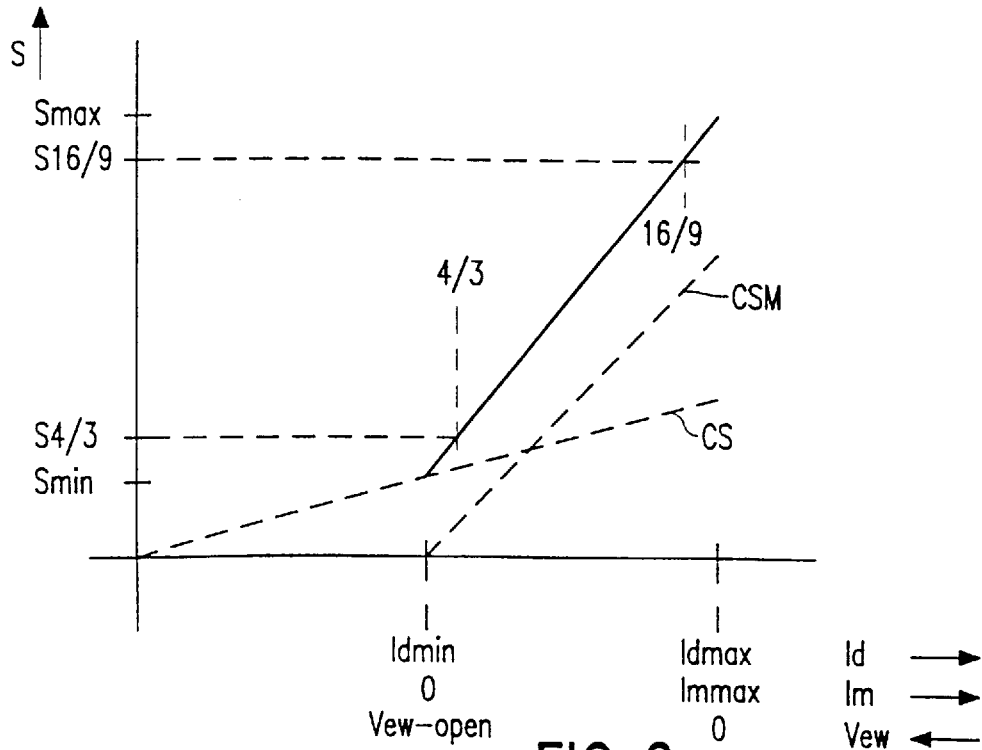
FIG. 2 shows, in a graph, the amount of S-correction obtained in the diode modulator shown in FIG. 1 at different amplitudes of the line deflection current.

FIG. 2 shows, in a graph, the amount of S-correction obtained in the diode modulator shown in FIG. 1 at different amplitudes of the line deflection current Id, without the use of the additional capacitor. The vertical axis in the graph represents the amount of S-correction. The line deflection current Id, the common current Im and the voltage Vew at the junction point T2 are plotted on the horizontal axis in the graph.

The voltage Vew has a maximal value Vew-open if, at the junction point T2, no external modulator voltage Vew is applied. The line deflection current Id through the line deflection coil LD has the minimal value Idmin as the voltage Vew has the maximal value Vew-open and, thus, the voltage across the line deflection coil is minimal. The modulator current Ib has its maximal value Ibmax as the voltage across the modulator coil LB is maximal. The diode modulator is in equilibrium, so the minimal line deflection current Idmin equals the maximum current Ibmax through the modulator coil LB and the common current Im has a minimal value Immin equal to zero.

If the voltage Vew has a minimal value Vew-min equal to zero, a maximal voltage occurs across the line deflection coil LD and the maximal line deflection current Idmax Nwill be generated. The modulator current Ib has its minimal value Ibmin equal to zero as the voltage across the second coil LB is zero. The common current Im has its maximal value Immax equal to the maximal line deflection current Idmax.

The broken line, denoted by CS, shows the contribution of the S-capacitor CS to the total amount of S-correction which is shown as the solid line. The amount of S-correction generated by the S-capacitor CS depends on the line deflection current Id flowing through it. The contribution is minimal at the minimum value of the line deflection current Idmin, and maximal at the maximum line deflection current Idmax.

The broken line, denoted by CSM, shows the contribution of the inner-pincushion capacitor CSM to the total amount of S-correction. The contribution of the inner-pincushion capacitor CSM is caused by the common current Im flowing through it, and is, thus, zero at the minimal amplitude of the line deflection current Idmin and maximal at the maximum line deflection current Idmax. The total amount of S-correction is the sum of the contributions generated by the S-capacitor CS and the inner-pincushion capacitor CSM.

It becomes clear from the above that the minimal S-correction Smin occurs in the situation when the diode modulator is in equilibrium and the common current is zero. This minimal S-correction Smin is caused by the minimum deflection current Idmin flowing through the S-capacitor CS in series with the line deflection coil LD. The deflection current Id occurring at the 4/3 scan width on a picture tube screen with a 16/9 aspect ratio has a value near the minimum deflection current Idmin and thus the S-correction S4/3 obtained is slightly above the minimum S-correction Smin caused by the S-capacitor CS only. The circuit described in French patent application 9511035 is designed to obtain the right amount of S-correction at 16/9 scan width. It appeared that the amount of S-correction at 4/3 scan was too high. So an additional S-capacitance CS2 is activated by using a thyristor circuit S to lower the amount of S-correction at 4/3 scan width to an acceptable value.

Figure 3:
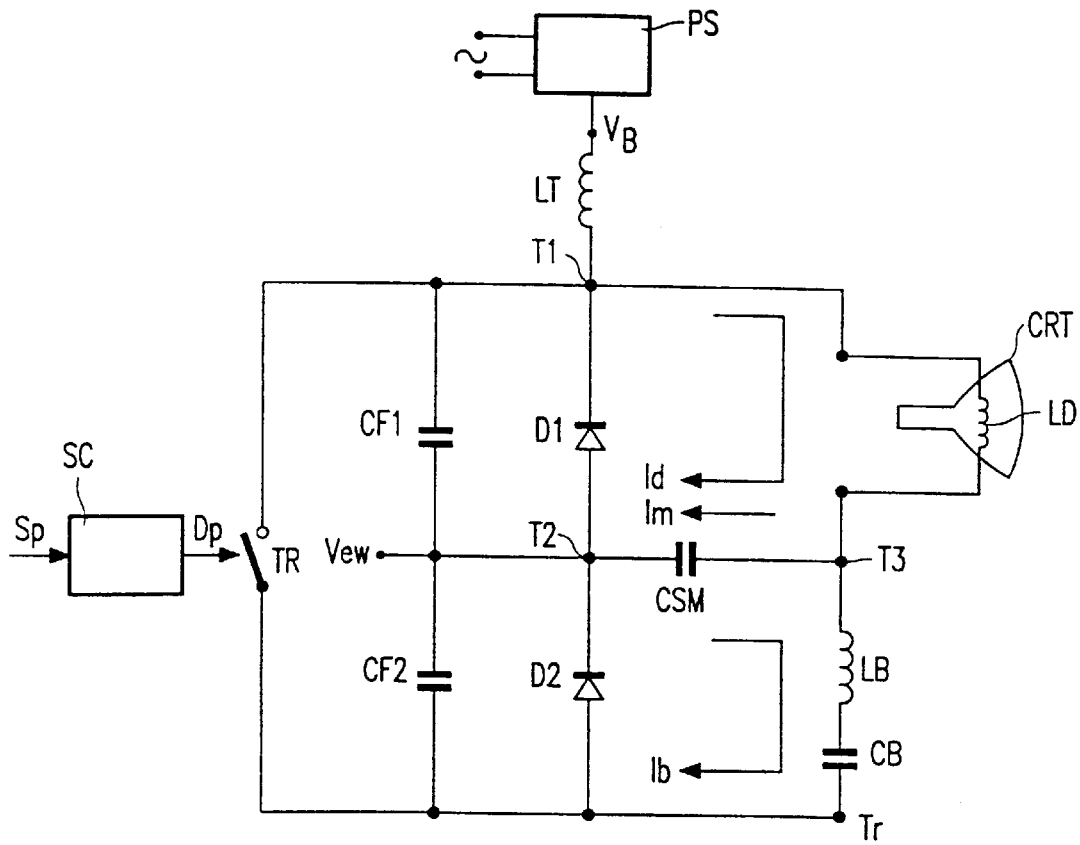
FIG. 3 shows a display apparatus comprising a diode modulator according to the invention.

FIG. 3 shows a display apparatus comprising a diode modulator according to the invention. The diode modulator according to the invention differs from the circuit described in French patent application 9511035 in that the S-correction capacitor CS in series with the line deflection coil LD is omitted. Due to the omission of the S-correction capacitor CS, there is no need for an additional S-capacitance CS2 and a thyristor circuit S either, as it is possible to obtain a larger difference between the amount of S-correction generated at a certain scan width (for example, 16/9) and the amount of S-correction generated at a smaller scan width (for example, 4/3). This will be explained in the description of FIG. 4. Preferably, a blocking capacitor CB is added to prevent an undefined DC-current flowing through the series arrangement of the line deflection coil LD and the modulator coil LB, if the modulator coil LB has one end connected to ground. Such a DC-current would give rise to an undefined shift of the displayed picture in the line direction. However, it is also possible to prevent this undefined shift without using the blocking capacitor. In a first solution, one end of the modulator coil LB is connected to the supply source VB. In a second solution, one end of the modulator coil LB is connected via a transformer winding to the first terminal T1 and supplies a voltage which is substantially equal to the voltage supplied by the supply source VB.

The display apparatus further comprises: a synchronizing circuit SC for receiving synchronizing pulses Sp from a video source, to supply line drive pulses Dp to the semiconductor switching element TR, a line voltage power supply PS for generating the supply voltage VB, and a picture tube CRT being line-scanned in response to the line deflection current Id flowing through the line deflection coil LD.

In a practical circuit of the diode modulator, according to the invention as shown in FIG. 3, the relevant components have the following values: LD=1.3 mH, LB=2.05 mH, VB=148 V, Vn=350 V, CF1=12 nF, CF2=15 nF, CB=2.2 uF, and CSM=330 nF. Vn=350 V is understood to mean that the peak value of the bias voltage Vn has a negative value of 350 V. At these values of the components, the generated amount of S-correction meets the demand of the Philips wide-screen picture tube W66ESF002X13 very well at scan widths ranging from full scan (16/9) to a scan width (4/3) which is about 33% smaller.

Figure 4:
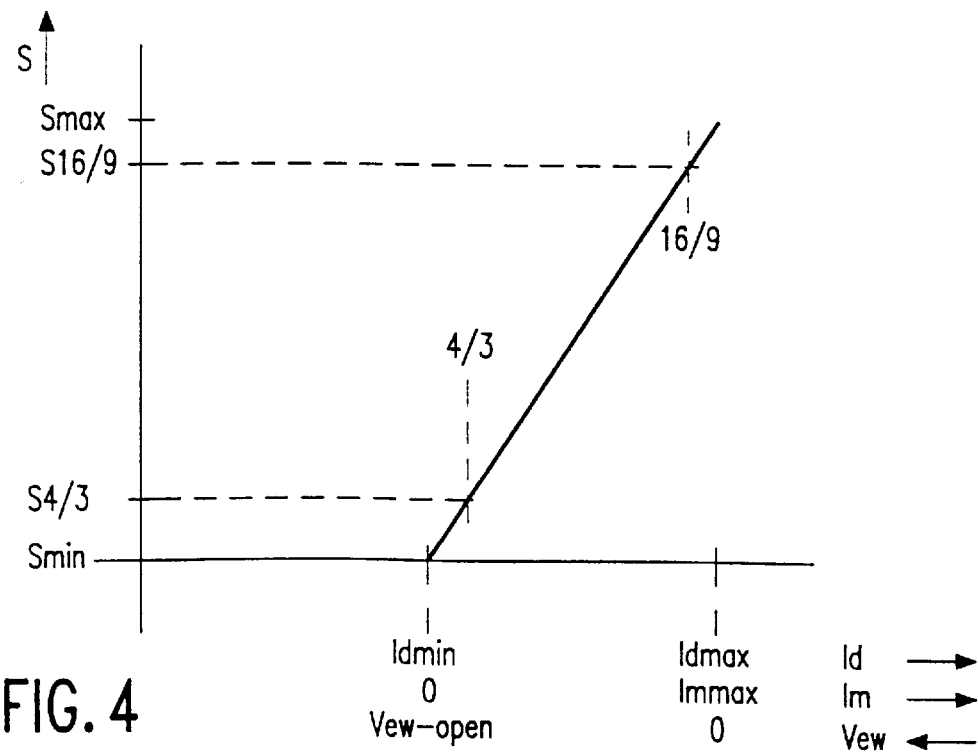
FIG. 4 shows, in a graph, the amount of S-correction obtained in the diode modulator of FIG. 3 at different amplitudes of the line deflection current.

FIG. 4 shows, in a graph, the amount of S-correction obtained in the diode modulator according to the invention at different amplitudes of the line deflection current Id. As in FIG. 2, the vertical axis in the graph represents the amount of S-correction, and the horizontal axis represents the line deflection current Id, the common current Im and the voltage Vew at the junction point T2. In fact, the total amount of S-correction is now generated by the inner-pincushion capacitor CSM only. Similarly as explained in the description of FIG. 2 for the broken line denoted by CSM, the total amount of S-correction is now zero at the minimal value of the line deflection current Idmin and maximal at the maximum amplitude of the line deflection current Idmax. At the 16/9 scan width, at which the line deflection current Id has a high value near the maximum line deflection amplitude Idmax, the amount of S-correction S16/9 depends on the occurring high value of the deflection current Id and the value of the inner-pincushion capacitor CSM. The high value of the deflection current Ib is fixed in dependence on the sensitivity of the picture tube-line deflection coil combination. The value of the inner-pincushion capacitor CSM has to be chosen in such a way that the amount of S-correction generated at the 16/9 scan width has the right value. At the 4/3 scan width, at which the line deflection current Id has a low value, the amount of S-correction S4/3 depends strongly on the difference between the amplitude of the low value of the deflection current Ib and the minimum value of the deflection current Idmin at which the S-correction is zero. The right amount of S-correction at the 3/4 scan can thus be obtained with the right choice of the minimum value of the deflection current Idmin which occurs if the diode modulator is in equilibrium. The minimum line deflection current Idmin is determined by the ratio of the inductance of the modulator coil LB and the line deflection coil LD.

Figure 5:
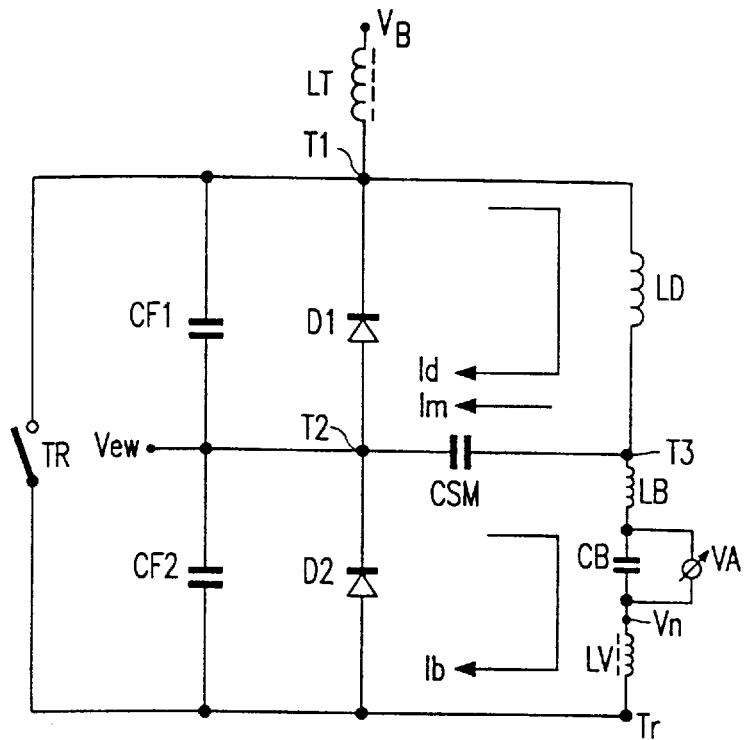
FIG. 5 shows another embodiment of the diode modulator according to the invention.

FIG. 5 shows another embodiment of the diode modulator according to the invention. This embodiment differs from the embodiment shown in FIG. 3 in that a voltage source LV has been added in series with the modulator coil LB, and an adjustable current source VA has been arranged in parallel with the blocking capacitor CB.

The voltage source LV generates a bias voltage Vn which is a negative flyback voltage Vn during the line flyback period and a positive scan voltage during the line scan period. The voltage source LV may be constituted by a coil magnetically coupled with another coil through which a line deflection-shaped current is flowing, for example, the choke-coil LT. It is known from the Philips Technical publication 201 that such a voltage source LV generates an additional sawtooth current to keep the second diode D2 forward biassed. It is stated that a negative voltage Vn from 150V to about 250V suffices to achieve this object.

This embodiment of the invention is based on the recognition that the bias voltage Vn generated by the voltage source LV should have a predetermined value such that there is an optimal S-correction. The choice of the value of the bias voltage Vn in the embodiment according to the invention may have two effects on the S-correction.

A first effect will be elucidated hereinafter. The blocking capacitor CB is herein assumed to have a large value, and at a different value of the bias voltage Vn, the value of the modulator coil Lb is adapted in such a way that the open E/W voltage Vew-open does not change. Consequently, the minimum value of the deflection current Idmin does not change. In this situation, the amount of S-correction is still zero because the line deflection current Id and the modulator current Ib cancel each other in the common path in which the inner-pincushion capacitor CSM is situated. The amount of S-correction at zero E/W voltage decreases because the voltage source LV causes a substantially sawtooth-shaped current through the modulator coil Lb which flows through the inner-pincushion capacitor CSM in the opposite direction to the line deflection current Id. This has the advantage that the value of the inner pincushion-capacitor CSM may be decreased. However, even more importantly the inner-pincushion capacitor CSM has to be selected in practice from a series of available discrete values. It is a further advantage of the voltage source LV, that by choosing the right value of the bias voltage Vn, it is possible to obtain the right amount of S-correction at a certain discrete value of the inner-pincushion capacitor CSM. So, the invention is based on the recognition that the bias voltage Vn should not only be selected in a suitable range so that the second diode D2 is kept conducting during the first part of the scan, but the bias voltage Vn is also one of the parameters influencing the amount of S-correction. At a fixed value of the modulator coil LB, the bias voltage Vn may also be used to determine the value of the minimum line deflection current Idmin at which the diode modulator is in equilibrium. This provides extra freedom in optimally designing the components of the diode modulator.

A second effect is obtainable by choosing the value of the blocking capacitor CB to be small. The current flowing through the blocking capacitor CB is influenced by the value of the substantially sawtooth-shaped current caused by the voltage source LV. An amplitude of a substantially parabola-shaped voltage across the blocking capacitor CB thus depends on the value of the bias voltage Vn. The shape of the modulator current Ib through the modulator coil LB will depend on the amount of parabola voltage across the blocking capacitor CB. And thus the shape of the current Im in the common path can be influenced by the value of the blocking capacitor CB and the value of the bias voltage Vn, whereby the bias voltage Vn has a larger influence at a larger amplitude of the line deflection current Id. Consequently, the value of the blocking capacitor CB and the bias voltage Vn can be determined to obtain a correction of the shape of the S-correction. The correction of the shape will be large at a large line scan width and small at a small line scan width. In this way, it is possible to correct for a slightly too large S-correction at the edges of the picture screen. In display apparatuses which have to display a picture fitting the dimensions of the picture screen, only one line scan width has to be generated. The too large S-correction was not visible as it occurred in the overscan. The too large S-correction at the edges of the screen will become visible if a continuous zoom between the 16/9 and 4/3 scan widths is possible.

The adjustable current source VA, which has been arranged in parallel with the blocking capacitor CB, generates a small DC-current through the line deflection coil LB during the line scan period. In this way, an adjustable line shift of the displayed picture is possible. The adjustable current source VA will have a very simple conjunction if the blocking capacitor CB has one terminal connected to the reference potential (ground or the supply voltage VB). It is of course possible to equip the diode modulator according to the invention as shown in FIG. 3 with the adjustable current source VA only or the bias voltage source Vn only.

Figure 6:
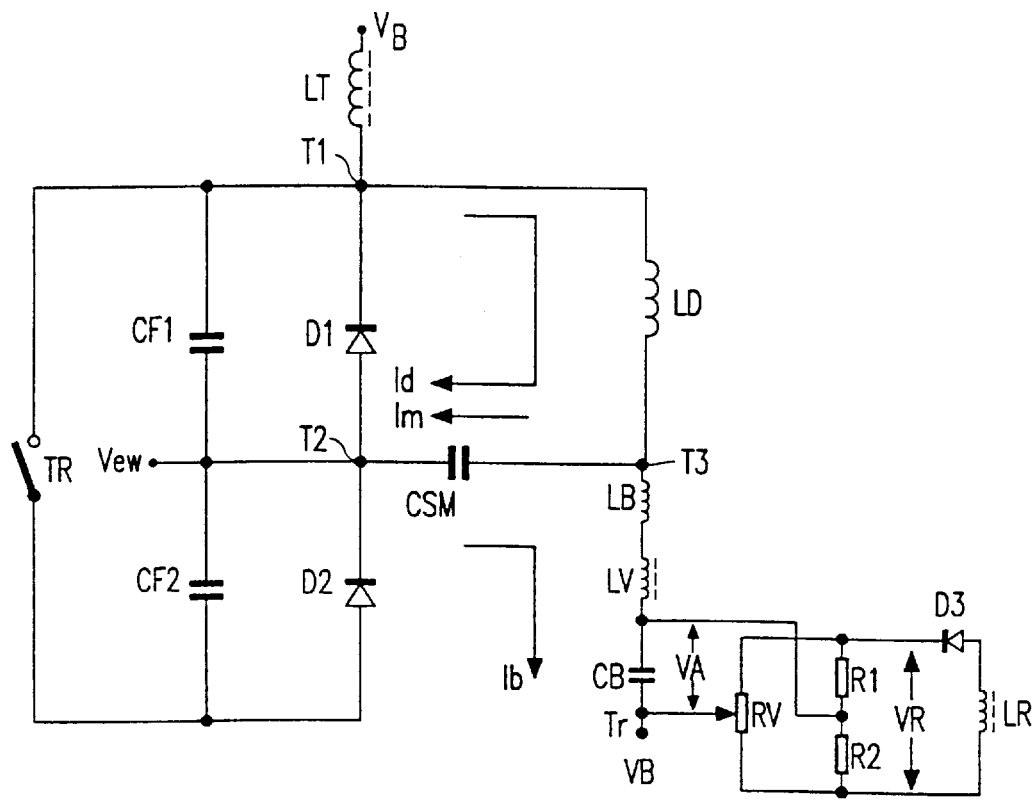
FIG. 6 shows an embodiment of the diode modulator which comprises a detailed line-shift circuit according to the invention.

FIG. 6 shows an embodiment of the diode modulator which comprises a detailed line-shift circuit according to the invention. This circuit differs from the circuit shown in FIG. 5 in that the series arrangement of the second coil LB, the bias voltage source LV and the blocking capacitor CB are adapted to have one end of the blocking capacitor CB connected to the supply voltage VB. The adjustable current source VA comprises a transformer winding LR which is magnetically coupled to the choke-coil LT, a rectifier element D3 having a first end coupled to a first end of the transformer winding LR for supplying a rectified voltage Vr, a series arrangement of a first and a second resistor R1, R2 coupled between a second end of the rectifier element D3 and a second end of the transformer winding LR, the junction point of the first and the second resistor R1, R2 being coupled to one end of the blocking capacitor CB, and an adjustable resistor RV having a slider contact which is coupled to another end of the blocking capacitor CB and fixed contacts which are connected in parallel with the series arrangement of the first and the second resistor R1, R2. The operation of the DC-shift circuit will be described hereinafter. The rectified voltage VR generates a current through the series arrangement of the first and the second resistor R1, R2. If the slider contact of the variable resistor RV is in the position in which the supply voltage VB is connected to a terminal of the first resistor R1, the voltage VA across the blocking capacitor CB is positive. If the slider contact of the variable resistor RV is in the position in which the supply voltage VB is connected to a terminal of the second resistor R2, the voltage VA across the blocking capacitor CB is negative. Consequently, a line shift is possible in both directions with respect to a nominal line position by adjusting the position of the slider contact. The DC-shift circuit, according to the invention, is very simple. In the known diode modulator, in which the S-capacitor CS is arranged in series with the line deflection coil LD and without a blocking capacitor CB in series with the modulator coil LB, the same DC-shift circuit could be arranged across the S-correction capacitor CS. This has the disadvantages that the DC-shift circuit would dissipate significantly or influence the S-correction, and that the transformer winding LR of the DC-shift circuit would have to be better isolated to cope with the high voltage pulses occurring at terminals of the S-correction capacitor CS. Also, parasitic effects would become more disturbing due to the high voltage pulses. It may be clear that the simple DC-shift circuit, according to the invention, only functions if no other capacitor than the blocking capacitor CB is arranged in series with the series arrangement of the line deflection coil LD and the modulator coil LB, thus, only if no S-capacitor CS is arranged in series with the line deflection coil LD. It would be possible to obtain a somewhat larger line-shift range by adding a smoothing capacitor (not shown) in parallel with the series arrangement of the first and the second resistor R1, P2.

The invention can be used in picture display apparatuses in which the display screen is scanned in the usual way by scanning horizontal lines which succeed each other in the vertical direction. The invention can also be used in picture display apparatuses in which the display screen is scanned in the so-called transposed scan mode by scanning vertical lines which succeed each other in the horizontal direction.

While the invention is preferably applied in wide-screen television sets arranged for displaying TV signals having a 16/9 aspect ratio and TV signals having a 4/3 aspect ratio, the invention can also be used in 4/3 aspect ratio television sets. In the latter application of the invention, the advantage is obtained that an S-correction is achieved in a diode modulator without a separate S-correction capacitance. It should be noted that the above-mentioned embodiments illustrate rather than limit the invention, and that those skilled in the art will be able to design many alternative embodiments without departing from the scope of the appended claims.

A major aspect of the invention can be summarized as follows. The invention provides a diode modulator circuit which is adapted to supply an acceptable S-correction of the S-linearity error of the line scanning of a picture tube CRT at substantially different line scan widths. A known diode modulator comprises two loops. The first loop comprises a series arrangement of a line deflection coil LD and an S-capacitor CS, which series arrangement is arranged in parallel with a first flyback capacitor CF1 and a first diode D1. The second loop comprises a modulator coil LB arranged in parallel with a second flyback capacitor CF2 and a second diode D2. The two loops are arranged in series. An inner-pincushion capacitor CSM is arranged in a common path in which the line deflection current Id and a modulator current Ib flowing through the modulator coil LB flow in opposite directions. The amount of S-correction depends on the values of the S-correction capacitor SC and the inner-pincushion capacitor CSM. The S-capacitor CS has been omitted in the diode modulator according to the invention. In this way, the amount of S-correction at minimal scan width will be zero because the common current Im flowing in the common path is zero if the diode modulator is in equilibrium. The diode modulator according to the invention can thus cope with picture tubes CRT which require a very low amount of S-correction at a small scan width without the need for an additional capacitor CS2 and a thyristor switching circuit T to activate the additional capacitor CS2 to lower the amount of S-correction at the small scan width. The invention is particularly useful if a continuous zoom between a 16/9 and a 4/3 scan width on a display tube with a 16/9 aspect ratio has to be performed in a simple way.

We claim:

1. A diode modulator comprising:

a first parallel arrangement of a first diode and a first capacitor;

a second parallel arrangement of a second diode and a second capacitor, said second parallel arrangement being arranged in series with said first parallel arrangement;

a switching element coupled across the series arrangement of said first and second parallel arrangements, a first terminal of the switching element being connected to a cathode of the first diode, a cathode of the second diode being connected to an anode of the first diode at a first junction point of said first and second parallel arrangements;

a deflection coil having a first end non-capacitively coupled to the first terminal and a second end non-capacitively coupled to a further terminal;

a modulator coil coupled between the further terminal and a reference terminal;

a third capacitor coupled between the first junction point and the further terminal, a common current flowing through the third capacitor, said common current being composed of a deflection current flowing through the deflection coil and a modulator current flowing through the modulator coil, the deflection current and the modulator current flowing in opposite directions through the third capacitor; wherein an amount of line S-correction depends on the common current and a value of the third capacitor only; and a voltage source coupled between the reference terminal and an end of the modulator coil which is not coupled to the further terminal, the voltage source supplying a voltage having a positive DC-value during a line scan period and a negative flyback voltage during a line flyback period to said end of the modulator coil which is not coupled to the further terminal.

2. A diode modulator as claimed in claim 1, wherein the voltage source comprises a third coil which is magnetically coupled to a choke-coil coupled between a supply source connection and the first terminal.

3. A diode modulator as claimed in claim 1, wherein the diode modulator further comprises:

a blocking capacitor arranged in series with the modulator coil; and an adjustable current source arranged in parallel with the blocking capacitor for generating an adjustable DC-current through the deflection coil during a scan period of the line scanning.

4. A diode modulator as claimed in claim 3, wherein one end of the blocking capacitor is connected to the reference terminal.

5. A diode modulator as claimed in claim 3, wherein the diode modulator comprises a choke-coil coupled between a supply source connection and the first terminal, and wherein the adjustable current source comprises:

a winding magnetically coupled to the choke-coil;

a rectifier element having a first end coupled to a first end of the winding;

a series arrangement of a first and a second resistor coupled between a second end of the rectifier element and a second end of the winding, a second junction point of the first and the second resistors being coupled to one end of the blocking capacitor; and an adjustable resistor having a slider contact coupled to another end of the blocking capacitor and fixed contacts arranged in parallel with the series arrangement.

6. A diode modulator as claimed in claim 1, wherein the reference terminal is coupled to a supply source connection for receiving a power supply voltage.

7. A picture display device having a diode modulator comprising:

a first parallel arrangement of a first diode and a first capacitor;

a second parallel arrangement of a second diode and a second capacitor, said second parallel arrangement being arranged in series with said first parallel arrangement;

a switching element coupled across the series arrangement of said first and second parallel arrangements, a first terminal of the switching element being connected to a cathode of the first diode, a cathode of the second diode being connected to an anode of the first diode at a junction point of said first and second parallel arrangements;

a deflection coil having a first end non-capacitively coupled to the first terminal and a second end non-capacitively coupled to a further terminal;

a modulator coil coupled between the further terminal and a reference terminal;

a third capacitor coupled between the junction point and the further terminal, a common current flowing through the third capacitor, said common current being composed of a deflection current flowing through the deflection coil and a modulator current flowing through the modulator coil, the deflection current and the modulator current flowing in opposite directions through the third capacitor, wherein an amount of line S-correction depends on the common current and a value of the third capacitor only; and a voltage source coupled between the reference terminal and an end of the modulator coil which is not coupled to the further terminal, the voltage source supplying a voltage having a positive DC-value during a line scan period and a negative flyback voltage during a line flyback period to said end of the modulator coil which is not coupled to the further terminal; the picture display device further comprising:

a synchronizing circuit for receiving synchronization information from a video source to supply drive pulses to a control input of the switching element; and a picture tube which is line-scanned in response to the line deflection current flowing through the deflection coil.

\* \* \* \* \*